United States Patent
Boskovic

(10) Patent No.: US 7,275,058 B2
(45) Date of Patent: Sep. 25, 2007

(54) METHOD AND SYSTEM FOR FINDING A K ORDER STATISTIC IN A UNION OF SORTED SETS

(75) Inventor: Ronald Boskovic, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 863 days.

(21) Appl. No.: 10/368,234

(22) Filed: Feb. 18, 2003

(65) Prior Publication Data

US 2004/0162817 A1 Aug. 19, 2004

(51) Int. Cl.
*G06F 17/30* (2006.01)

(52) U.S. Cl. .......................................... 707/7

(58) Field of Classification Search ............... None
See application file for complete search history.

(56) References Cited

U.S. PATENT DOCUMENTS

| | | | |
|---|---|---|---|
| 4,456,968 A | 6/1984 | Carter et al. | |
| 4,802,108 A | 1/1989 | Bagdis et al. | |
| 5,206,601 A | 4/1993 | Ready | |
| 5,408,675 A | 4/1995 | Florentino et al. | |
| 5,426,785 A | 6/1995 | Coffield | |
| 5,532,948 A | 7/1996 | Kohno et al. | |
| 5,708,693 A | 1/1998 | Aach et al. | |
| 5,737,251 A | 4/1998 | Kohno et al. | |
| 6,108,658 A | 8/2000 | Lindsay et al. | |
| 6,208,764 B1 * | 3/2001 | Archer et al. | 382/260 |
| 2001/0034749 A1 | 10/2001 | Jiang | |
| 2002/0073126 A1 | 6/2002 | Kim | |

FOREIGN PATENT DOCUMENTS

JP 11-72555 3/1999

OTHER PUBLICATIONS

An Improved Approach to Fault Tolerant Rank Order Filtering on a SIMD Mesh Processor, Proceedings of the IEEE International Workshop on Defect and Fault Tolerance in VLSI Systems (DFT '95), pp. 137-145.
Filtering, A Note on the Use of Nonlinear Filtering in Computer Graphics, Mark E. Lee, Amoco Production Company Tulsa Research Center, Richard A. Redner, The University of Tulsa, May 1990 pp. 23-29.

* cited by examiner

*Primary Examiner*—Joon Hwan Hwang

(57) ABSTRACT

A method for determining a k order statistic is provided. The method initiates with identifying at least two sorted sets. Then, a recurrence configured to eliminate elements of the at least two sorted sets is defined. Next, an index value associated with a k order statistic is reduced through the recurrence to obtain a base case. After obtaining the base case, a minimum value of remaining elements is selected from the at least two sorted sets. The minimum value corresponds to the k order statistic. A display controller having circuitry for determining a median value and a computer readable medium having program instructions for determining a k order statistic are also provided.

20 Claims, 12 Drawing Sheets

METHOD AND SYSTEM FOR FINDING A K ORDER STATISTIC IN A UNION OF SORTED SETS

BACKGROUND OF THE INVENTION

1. Field of the Invention

This invention relates generally to multi-set lookup systems and methods and more particularly to a system and method for determining a k order statistic across multiple sorted sets.

2. Description of the Related Art

Many applications require finding a median of a number of values, or a value associated with a particular rank in a union of sets, as sorting is a common task in computer applications. For example, finding a median with respect to image processing allows for images to be smoothed should a pixel value be in error. Additionally, in regard to enterprise databases it may be desirable to find a median or a k order statistic associated with the data stored in the database. Linear time algorithms exist for finding a k order statistic in an unsorted set. For example, quicksort uses a divide and conquer approach for finding a median value, dividing the total array in two parts, then choosing the appropriate part and recursively dividing it into two parts, and so on. Here, a random element in the set is chosen and the set is split into elements larger and elements smaller than the chosen element. Eventually, just one value remains.

Linear time algorithms are the fastest in an unsorted domain search because each element has to be considered. However, where the search domain consists of fully sorted subsets, linear time algorithms still consider each element. The consideration of each element in a fully sorted subset is inefficient.

FIG. 1 illustrates a merging technique applied to two sorted subsets to determine a location of a desired value. Here, sorted set A 100 and sorted set B 102 are merged to form sorted set 104 which is the union of sorted set A and sorted set B. If the $11^{th}$ smallest value is desired, then the $11^{th}$ smallest value of merged, sorted set 104 is the value of 20 in cell 106. However, the merging technique still requires a linear number of comparisons between elements of sorted sets A 100 and B 102. The advantage is that the result is a fully sorted set, allowing for consequent searches to be done in constant time. However, maintaining a merged set of the two ordered subsets consumes memory resources.

As a result, there is a need to solve the problems of the prior art to provide a method and apparatus for efficiently determining a k order statistic in a union of a plurality of sorted sets without merging the ordered subsets.

SUMMARY OF THE INVENTION

Broadly speaking, the present invention fills these needs by providing a method for maintaining separate sorted sets and indexing the union of the sets to determine the location of a desired value. It should be appreciated that the present invention can be implemented in numerous ways, including as a process, a system, or a device. Several inventive embodiments of the present invention are described below.

In one embodiment, a method for determining an element corresponding to an index value for a union of a first sorted set and a second sorted set is provided. The method initiates with selecting both a first element associated with a first sorted set sub index and a second element associated with a second sorted set sub index. The sum of the first sorted set sub index and the second sorted set sub index is equal to an index value. Then, a lowest element of the first element and the second element is determined. Next, the lowest element and preceding lower elements of a respective sorted set are discarded. Then, the index value is decremented by the sub index of the respective sorted set. Next, the above operations are repeated until the index value equals one. When the index value reaches one, a minimum remaining value is selected as the element corresponding to the index value.

In another embodiment, a method for determining a k order statistic across a plurality of sorted sets is provided. The method initiates with identifying an index value associated with the k order statistic. Then, a sub-index value is defined for each of the plurality of sorted sets. Next, a lowest value element and all preceding elements are eliminated from a sorted set corresponding to the lowest value element. Then, the index value is decremented by an amount equal to a number of eliminated elements. Next, the above operations are repeated until the index value equals one. When the index value reaches one, a minimum remaining element is selected from one of the plurality of sorted sets as the location of the k order statistic.

In yet another embodiment, a method for searching a plurality of sorted sets for a desired location within a virtual union of the plurality of sorted sets is provided. The method initiates with defining a value to be located. The value to be located is associated with an index value. Then, a sub-index value is selected for each of the plurality of sorted sets. Next, a minimum element is identified from elements associated with the sub-index value for each of the plurality of sorted sets. Then, a recurrence is defined. Next, the recurrence is repeated until the index value is reduced to a minimum value. When the index value is a minimum value, the value to be located is selected from elements in each of the plurality of sorted sets.

In still yet another embodiment, a method for determining a k order statistic is provided. The method initiates with identifying at least two sorted sets. Then, a recurrence configured to eliminate elements of the at least two sorted sets is defined. Next, an index value associated with a k order statistic is reduced through the recurrence to obtain a base case. After obtaining the base case, a minimum value of remaining elements is selected from the at least two sorted sets. The minimum value corresponds to the k order statistic.

In another embodiment, a method for determining a median value of a sliding window is provided. The method initiates with identifying a plurality of subsets. Then, each of the plurality of subsets is sorted. Next, a combined subset and a single subset are defined from the plurality of subsets. Then, at least one top element and at least one bottom element of the combined subset are discarded. This number is calculated as a half of the difference between the number of elements in the combined subset and the single subset, rounded down. Next, the median value of the combined subset and the single subset is determined.

In yet another embodiment, a computer readable media having program instructions for determining a k order statistic is provided. The computer readable media includes program instructions for identifying at least two sorted sets and program instructions for defining a recurrence to eliminate elements of the at least two sorted sets. Program instructions for reducing an index value associated with a k order statistic through the recurrence to obtain a base case are included. Program instructions for selecting a minimum value of remaining elements of the at least two sorted sets after obtaining the base case are provided. The minimum value represents the k order statistic.

In still yet another embodiment, a computer program product for determining a median value for sliding window is provided. The computer program product includes program instructions for identifying a plurality of subsets and program instructions for sorting elements of each of the plurality of subsets. Program instructions for defining a combined subset and a single subset from the plurality of subsets are provided. Program instructions for discarding at least one top element and at least one bottom element of the combined subset based on the difference between the number of elements in the combined subset and the single subset, and program instructions for determining a median value of the combined subset and the single subset are also included.

In another embodiment, a display controller having circuitry for determining a median value is provided. The display controller includes circuitry for identifying a window region defined over elements of a grid composed of columns and rows. Circuitry for sorting elements of each column is provided. Circuitry for merging all the sorted columns, except a first sorted column, thereby defining a combined column is also included. Circuitry for determining a median of the elements defined by a virtual union of the first sorted column and the combined column is provided.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF TILE PREFERRED EMBODIMENTS

Figure 1:
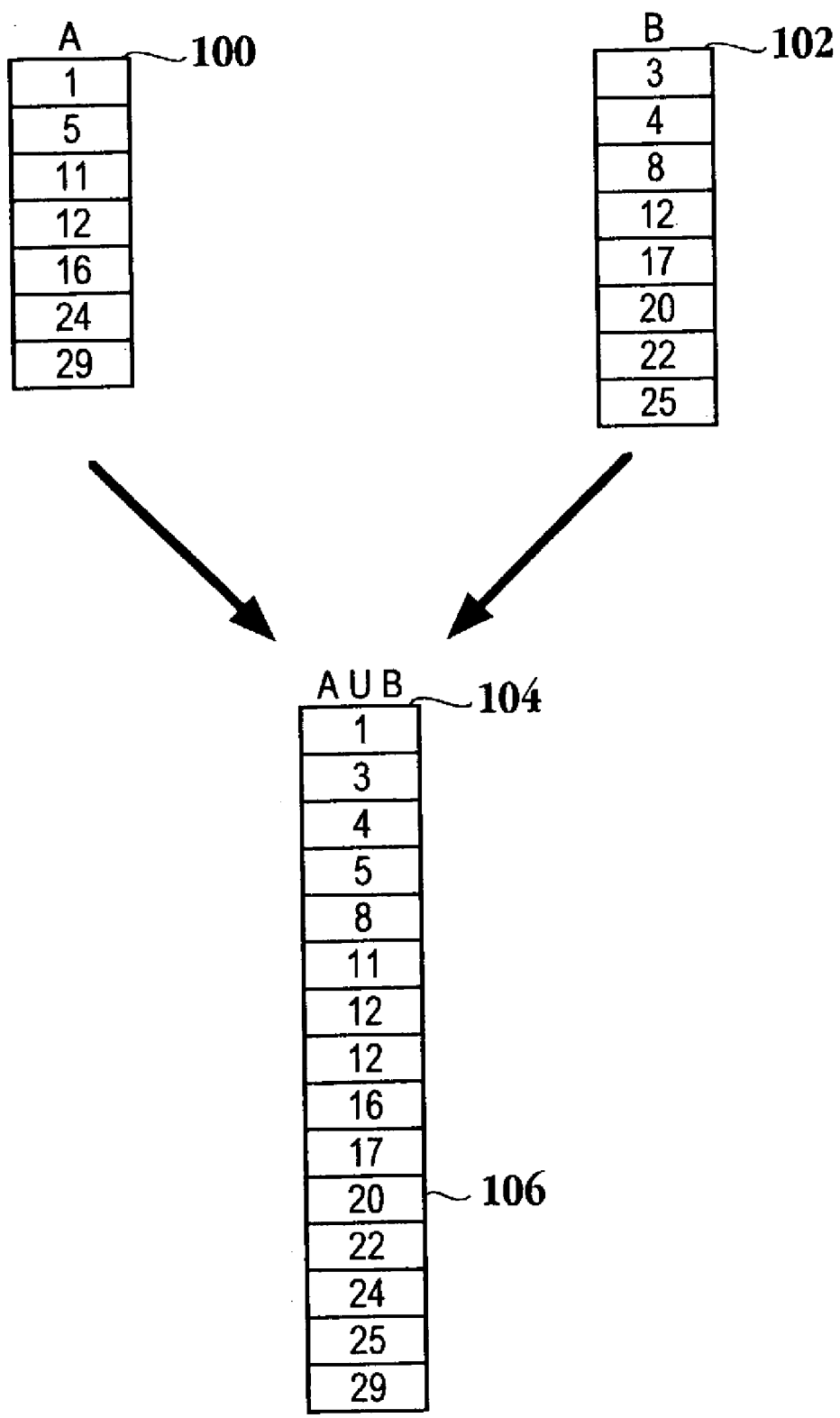
FIG. 1 illustrates a merging technique applied to two sorted subsets to determine a location of a desired value.

An invention is described for an apparatus and method for finding the $k^{th}$ smallest element across several sorted sets. It will be obvious, however, to one skilled in the art, that the present invention may be practiced without some or all of these specific details. In other instances, well known process operations have not been described in detail in order not to unnecessarily obscure the present invention. FIG. 1 is described in the "Background of the Invention" section. The term about as used to herein refers to +/−10% of the referenced value.

The embodiments of the present invention define a method and apparatus for finding a k order statistic in a union of sorted sets without the need to merge the sorted sets. The method takes advantage of the property of sorted sets to execute a, k order statistic search using $O(n^2 \log k)$ comparisons, where n is the number of sorted sets, k is the order statistic, also referred to as a an index value, and O function describes the non-constant part of the upper-limit execution time of the algorithm. As used herein, a k order statistic of a set is the $k^{th}$ smallest or largest element of the set. In one embodiment, an element of each sorted set is selected and the minimum of the selected elements is determined. The minimum element and the elements, preceding the minimum element in the corresponding set are eliminated form consideration, i.e., discarded. The elimination of the elements defines a recurrence that can be used to determine the k order statistic without the need to merge the sorted sets. Accordingly, the method has a small memory footprint proportional to the total number of elements. In addition, the sorted sets are not modified in any way. In one embodiment, the method may be thought of as creating a virtual union of the sorted sets, i.e., the sorted sets are regarded as a union but the sets remain physically separate. Therefore, the extra processing associated with merging two or more sets is avoided.

One skilled in the art will appreciate that by eliminating the need to actually merge the sets to find a k order statistic allows for the determination of a k order statistic between ordered subsets that may exist in databases that are not configured to communicate with each other for merging the data, i.e., where two or more tables exist in different databases on different systems. Here, the embodiments of the invention described below allow for indexing of a virtual combined table in logarithmic time, without having to merge any tables. Another application appropriate for the embodiments described herein includes cross referencing two or more tables for statistical purposes. For example, it may be useful to cross reference tables containing related information, i.e., salaries, age, demographic data, etc., in order to draw a distribution graph, such as a Bell curve. Here, access to strategically chosen percentiles (k order statistics) allows for an approximation of the graph to be drawn in logarithmic time.

Furthermore, with respect to a pay per field database, the present invention may be used to minimize the number of fields accessed before the range of fields needed is determined. Similarly, where it is difficult to exchange data between hosts of two or more tables being cross-referenced from a lack of resources, network limitations, etc., the embodiments described herein allow for fields to be retrieved from remote tables with the least amount of data exchanges. As will be described in more detail below, the present invention may also be used over small volatile sets, such as a sliding window median filter for image processing applications. It should be appreciated that the applications described above are exemplary and not meant to be limiting as the embodiments herein are generally applicable to any application where it is desired to determine a location of a particular value between two or more sorted sets.

Figure 2A:
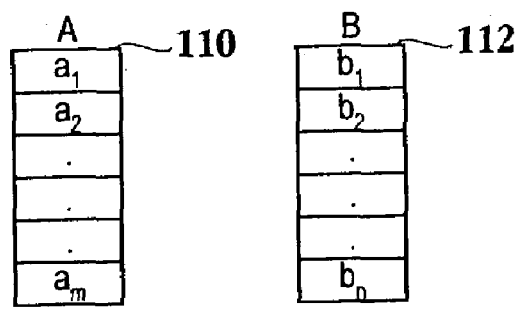
FIGS. 2A-2C are schematic diagrams of two sorted sets for illustrating the technique of locating a k order statistic in accordance with one embodiment of the invention.
Figure 2B:
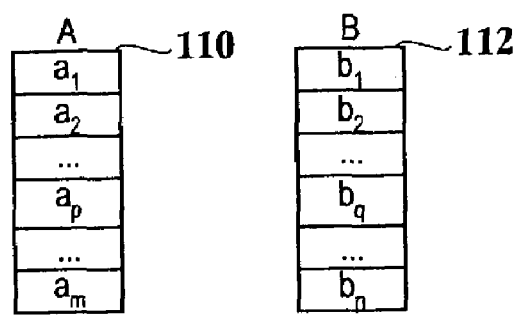
Figure 2C:
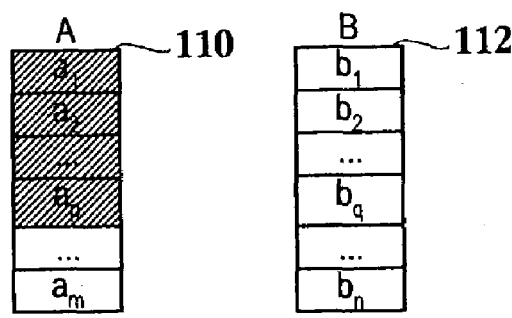

FIGS. 2A-2C are schematic diagrams of two sorted sets for illustrating the technique of locating a k order statistic in accordance with one embodiment of the invention. Sorted set A 110 includes elements $a_1$-$a_m$ and sorted set B 112 includes $b_1$-$b_n$. It should be appreciated that the elements $a_1$-$a_m$ and $b_1$-$b_n$ of the respective sorted sets are arranged in an ordered fashion. That is, the elements proceed in an ascending or descending order from the top of the set to the bottom of the set. Moving to FIG. 2B, sub-indices are selected and the elements corresponding to the sub-indices are determined. Here, the sub-indices are p and q for sorted set A 110 and B 112, respectively. Consequently, the elements corresponding to sub-indices p and q are $a_p$ and $b_q$, respectively. The sum of the sub-indices p and q is equal to the value of the k order statistic. In mathematical terms, p+q=k for this embodiment. For example, p may be defined as $\lfloor k/2 \rfloor$, where p is an integer that is less than or equal to k/2 and q may be defined as $\lceil k/2 \rceil$, where q is an integer that is greater than or equal to k/2. Thus, p defines a floor value and q defines a ceiling value.

Comparing the values of the elements corresponding to p and q, i.e., $a_p$ and $b_q$, allows for the elimination of the smaller of the two elements from consideration along with all the elements preceding the smaller element. That is, if $a_p < b_q$, then even if elements $b_1, b_2, \ldots b_{q-1}$ are smaller than $a_p$, there would still not be enough elements smaller than $a_p$ to make it the $k^{th}$ smallest element of the union of the sorted sets. Accordingly, all the elements smaller than $a_p$, including $a_p$, stand before the $k^{th}$ smallest element of the union of sorted sets A 110 and B 112 and may be eliminated. Furthermore, by eliminating elements $a_1, a_2, \ldots a_p$, (or $b_1, b_2, \ldots b_q$ if $a_p > b_q$) ensures that the method searches for the k−p (or k−q) order statistic in the remaining elements.

FIG. 2C is a schematic diagram of the sorted sets after the corresponding elements have been eliminated. It should be appreciated that the elimination of the smaller of the two elements corresponding to the sub-indices, along with all the elements preceding the smaller element defines a recurrence, which may be used to determine the k order statistic. Additionally, by choosing p=k/2 (floor, i.e., rounded down) and q=k/2 (ceiling, i.e., rounded up) the recurrence runs in logarithmic time. In one embodiment, where p>m, it is assumed that $a_p$ is greater than $b_q$. Likewise, if q>n, it is assumed that $b_q$ is greater than $a_p$. As will be described with reference to FIGS. 3A-3E, where m and n are not equal, the sorted set with the fewest elements may be padded with elements to make the number of elements in each sorted set equal. In one embodiment, infinitely large values may be included as the padded elements to cover the assumptions discussed above. Through the recurrence, the value of k is reduced until k=1, which may be referred to as the base case, wherein the smaller of the lowest remaining elements of sorted set A 110 and sorted set B 112 is the element corresponding to the k order statistic of the union of sorted set A and sorted set 112. Thus, the k order statistic for the union of two sorted sets may be determined without having to merge or combine the two sorted sets.

FIGS. 3A-3E are schematic diagrams providing an exemplary scheme for determining a k order statistic of the union of two sorted sets in accordance with one embodiment of the invention. Sorted set A 114 of FIG. 3A includes seven elements in ascending order from the top of the set to the bottom of the set. Sorted set B 116 includes eight elements in ascending order from the top of the set to the bottom of the set. In one embodiment, the number of elements for each of the sorted sets may be balanced by padding the sorted set with the fewest elements with infinitely large elements. For example, element 115 is added to the bottom of sorted set A 114 to bring the total number of elements for sorted set A to eight, i.e., even with sorted set B 116.

Figure 3A:
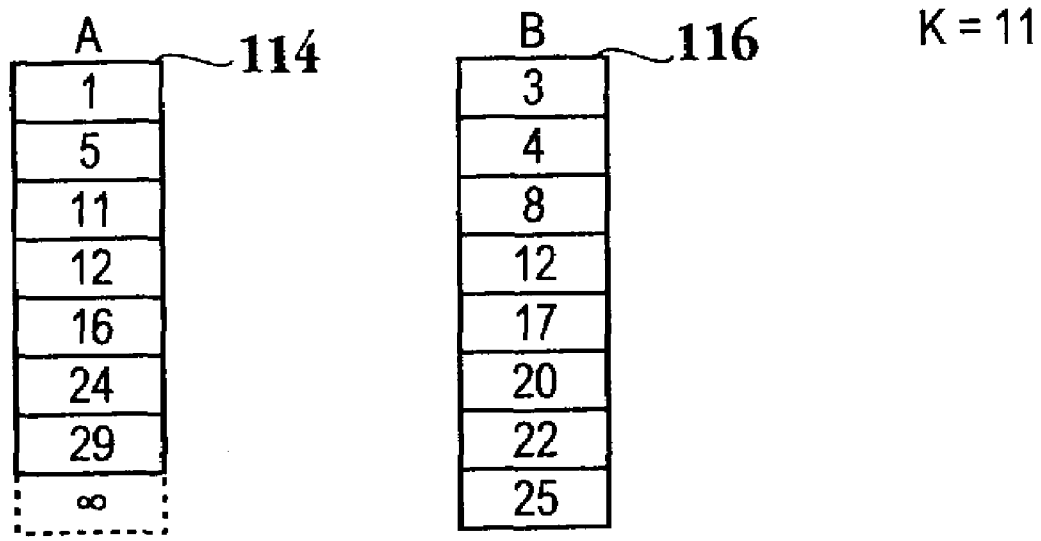
FIGS. 3A-3E are schematic diagrams providing an exemplary scheme for determining a k order statistic of the union of two sorted sets in accordance with one embodiment of the invention.
Figure 3B:
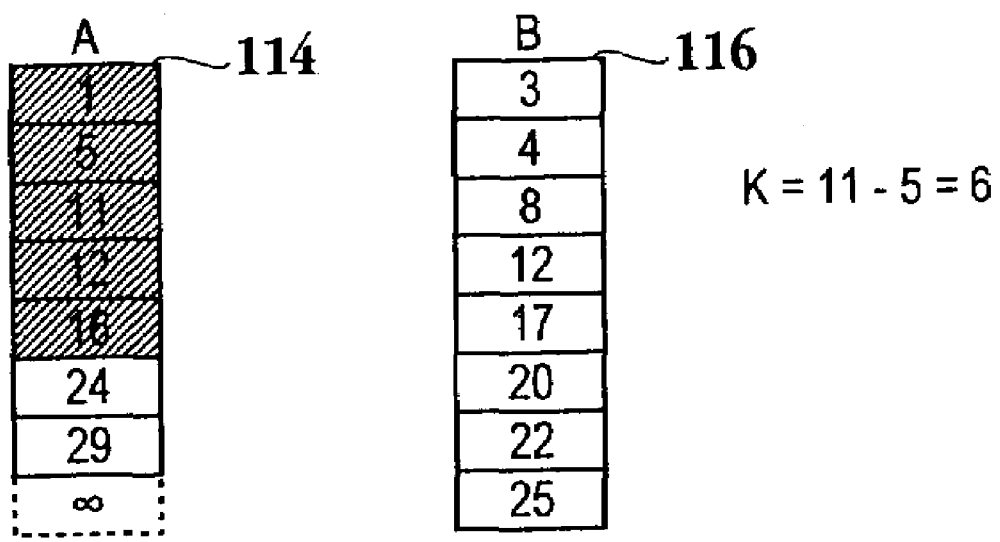

In FIG. 3B, the value of a k order statistic is selected and the first iteration of the recurrence is executed. For exemplary purposes k, also referred to as an index value, is selected as eleven. Thus, it is desired to find the $11^{th}$ smallest value of the union of sorted sets A and B. It should be appreciated that the index value is described as the $11^{th}$ smallest for exemplary purposes only and is not meant to be limiting. That is, the embodiments described herein may describe the index value as the smallest element, the largest element, any size between the smallest and largest element, a percentile, etc. Continuing with the example of FIG. 3B, after the index value is selected, the floor and ceiling corresponding to the index value is determined. As described above with reference to FIGS. 2A-2C, the sub-indices p and q are determined here. In one embodiment, p is defined as k/2, where p is an integer that is less than or equal to k/2 (floor value) and q is defined as k/2, where q is an integer that is greater than or equal to k/2 (ceiling value). Accordingly, the floor value, p, is five and the ceiling value, q, is six. Once the sub-indices are defined, the values of the sorted sets corresponding to the sub-indices $a_p$ and $b_q$ are compared. In FIG. 3B, the fifth element, $a_p$, of sorted set A 114 and the sixth element, $b_q$, of sorted set B 116 are compared to determine which is the lowest. Here, the value of the fifth element of sorted set A 114 is 16 and the value of the sixth element of sorted set B 116 is 20. Thus, 16<20 ($a_p<b_q$), so 16 and all the preceding elements of sorted set A 114 may be eliminated.

Figure 3C:
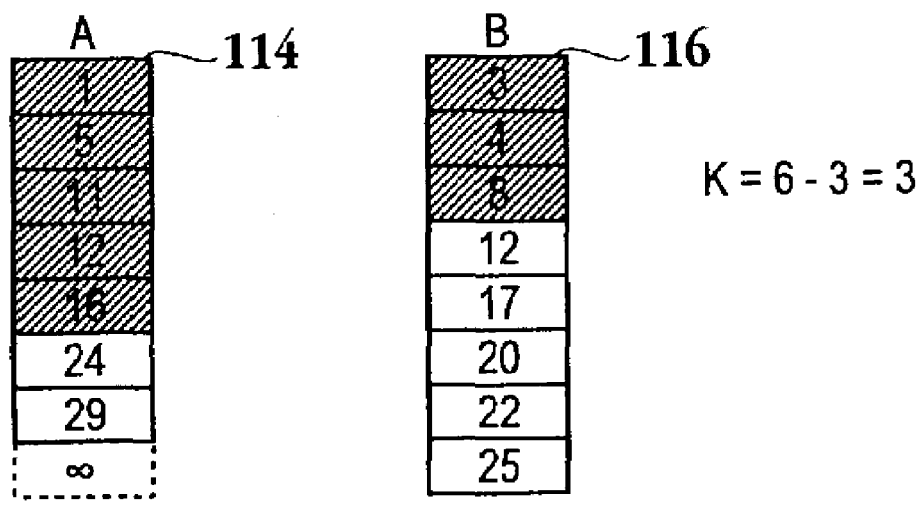

FIG. 3C depicts the results of the next iteration of the process for determining a k order statistic. Here, the index value is decremented by the sub-index associated with the sorted set from which elements have been eliminated. Therefore, the index value k is reduced by five to yield k=6 for the next iteration. As described above, sub-indices p and q are determined for the decremented index value of 6. For this iteration k/2 is equal to three, consequently, p and q are both equal to three. The third element of sorted set A 114, after the elimination of the previous five elements in FIG. 3B, is the infinitely large element. The third element of sorted set B 116 is eight. Here, ∞>8 ($a_p>b_q$), so 8 and all the preceding elements of sorted set B 116 may be eliminated.

Figure 3D:
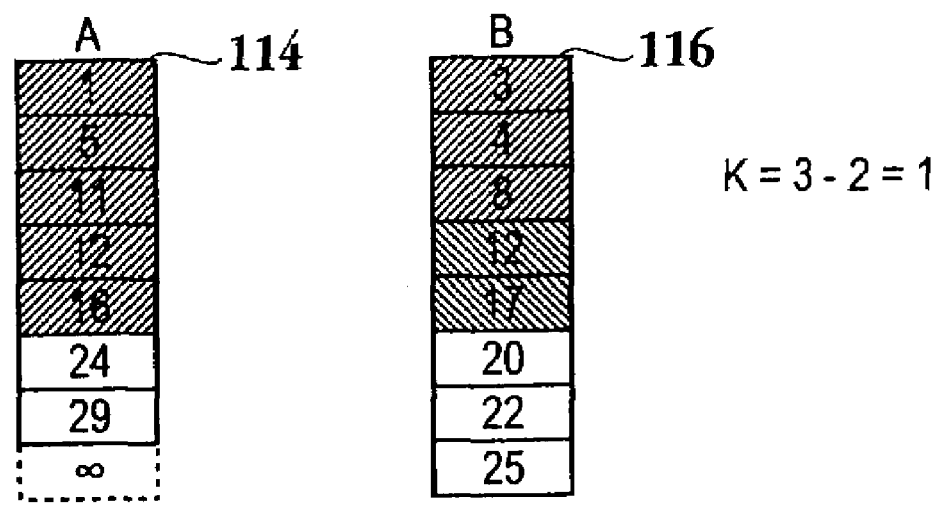

FIG. 3D depicts the results of the third iteration of the process for determining a k order statistic. Here, the index value is decremented by the sub-index associated with the sorted set from which elements have been eliminated. Therefore, the index value k is reduced by three to yield k=3 for the next iteration. As described above, sub-indices p and q are determined for the decremented index value of three. For this iteration, k/2 provides a floor value, p, equal to one and a ceiling value, q, equal to two. The first element of sorted set A 114 has a value of 24. The second element of sorted set B 116, after the elimination of the first three elements from the previous iteration, has a value of 17. Here, 24>17 ($a_p$>$b_q$), so 17 and all the preceding elements of sorted set B 116 may be eliminated.

Figure 3E:
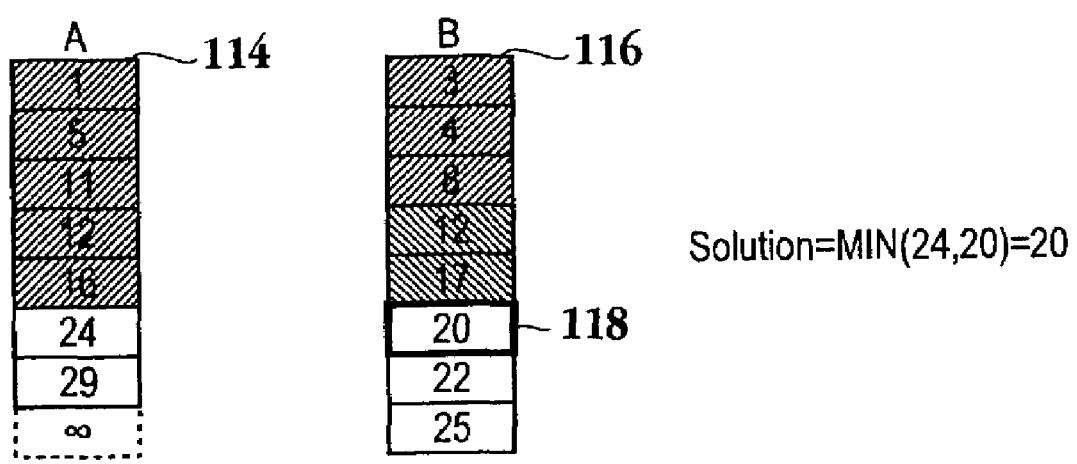

FIG. 3E depicts the base case of the process for determining a k order statistic. Here, the index value is decremented by the sub-index associated with the sorted set from which elements have been eliminated in the previous iteration or recurrence. Therefore, the index value k is reduced by two to yield k=1. When k=1, the top two elements are compared to determine which element is the smallest. The first element of sorted set A 114 has a value of 24. The first element of sorted set B 116, after the elimination of the first two elements from the previous iteration, has a value of 20. Here, 24>20, therefore, 20 is the value associated with the k order statistic. That is, the $11^{th}$ smallest value of the union of the two sorted sets is 20, which is determined without having to combine the sets.

Figure 4:
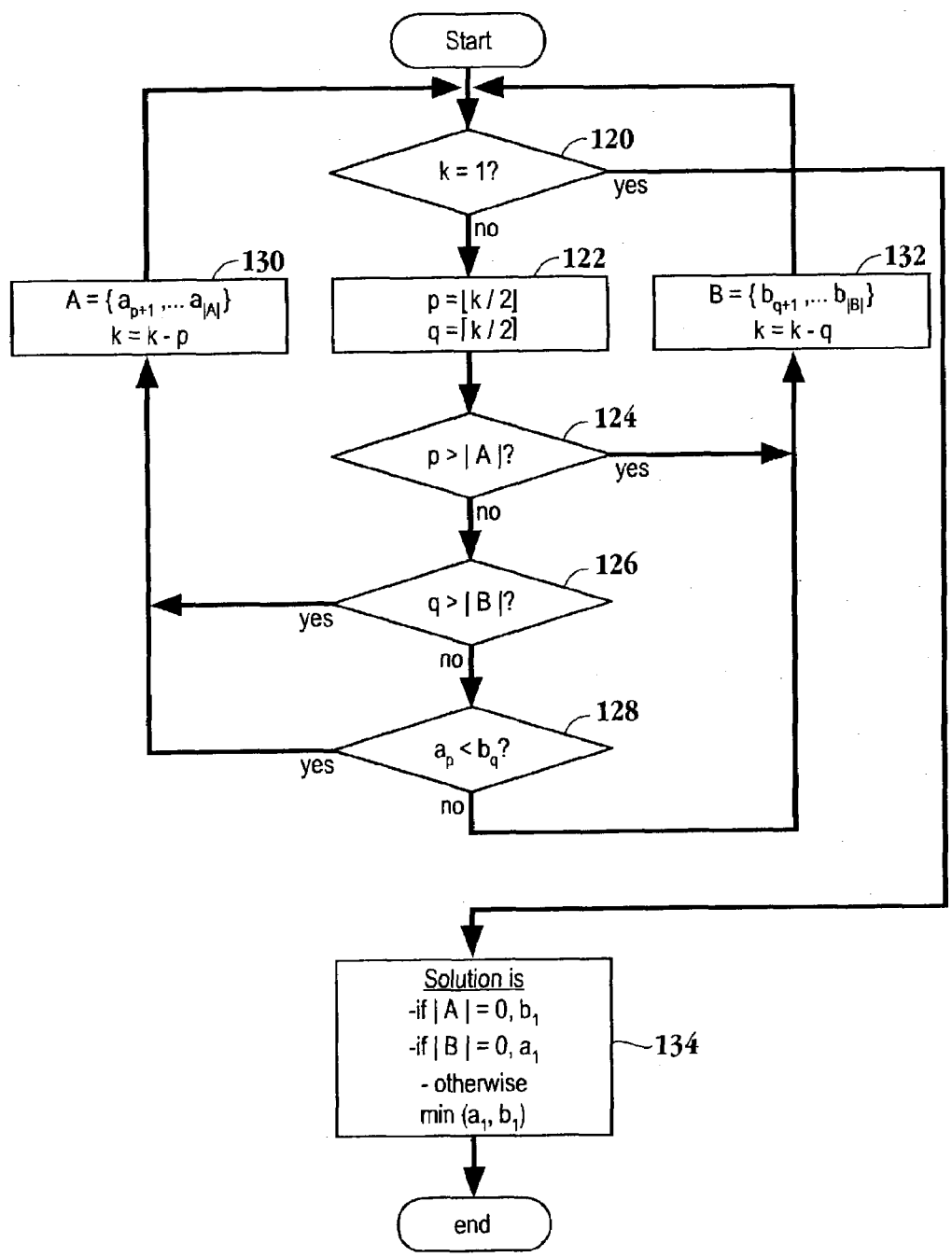
FIG. 4 is a flowchart diagram of the method operations for determining a k order statistic for the union of two sorted sets in accordance with one embodiment of the invention.

FIG. 4 is a flowchart diagram of the method operations for determining a k order statistic for the union of two sorted sets in accordance with one embodiment of the invention. The method initiates with decision operation 120 where it is determined if the index value is equal to one. If the index value is equal to one, then the method advances to operation 134 where the minimum of the first elements of the two sorted sets is the k order statistic. Of course, if one of the sorted sets does not have any remaining elements, i.e., is empty, then the first element of the sorted set having remaining elements is selected as the k order statistic. If the index value is not equal to one, then the method proceeds to operation 122, where sub-indices are defined. In one embodiment, the sub-indices define a floor value and a ceiling value, where the floor and the ceiling value are the two closest integers to the index value divided by two. In another embodiment, the sub-indices are configured to ensure a recurrence runs in logarithmic time.

The method then moves to decision operation 124 where it is determined if the sub-index corresponding to a first sorted set is greater than the number of elements in the first sorted set, i.e., if the value of p is out of bounds for the first sorted set. Of course, this determination is made prior to padding a sorted set as discussed with reference to FIGS. 3A-E. If the sub-index is greater than the number of elements in the first sorted set, then the method advances to operation 132. In operation 132, the elements of the second sorted set preceding and including the second sorted set sub-index are eliminated from the second sorted set. The index value is also decremented by an amount equal to the sub-index value here. The method then returns back to operation 120 and proceeds as described above. If the sub-index is not greater than the number of elements in the first sorted set, then the method advances to decision operation 126. Here, it is determined if the sub-index corresponding to a second sorted set is greater than the number of elements in the second sorted set, i.e., if the value of q is out of bounds for the second sorted set. If the sub-index is greater than the number of elements in the second sorted set, then the method advances to operation 130 from operation 126. In operation 130, the elements of the first sorted set preceding and including the first sorted set sub-index are eliminated from the first sorted set. The index value is also decremented by an amount equal to the sub-index value here. The method then returns back to operation 120 and proceeds as described above.

Still referring to FIG. 4, if the sub-index is not greater than the number of elements in the second sorted set in decision operation 126, then the method proceeds to decision operation 128. In decision operation 128, the element corresponding to the first sorted set sub-index, $a_p$, is compared to the element corresponding to the second sorted set sub-index, $b_q$, to determine whether or not $a_p$<$b_q$. If $a_p$ is less than $b_q$, then the method moves to operation 130 and proceeds as described above. If $a_p$ is not less than $b_q$, then the method moves to operation 132 and proceeds as described above. Thus, the recurrence defined by decision operation 128 and operations 130 and 132 reduces the index value to a base case enabling a k order statistic to be determined from two sorted sets that remain separate. It should be appreciated that the implementation of the method described with reference to FIGS. 4 and 5 also runs in logarithmic time, i.e., log k. However, one skilled in the art will appreciate that the method also depends on the number of sorted sets, n, which comes out to be quadratic. Accordingly, the order of an algorithm executing the method is $O(n^2 \log k)$.

It will be apparent to one skilled in the art that the flowchart of FIG. 4 may be optimized to further reduce comparisons. In one embodiment, decision operations 124 and 126 and the comparisons associated therewith, may be eliminated. For example, padding a sorted set having fewer elements with infinitely large values to balance the number of elements for each sorted set allows for the elimination of operations 124 and 126. In addition, preprocessing to ensure the values of p and q are not out of bounds relative to the respective sorted sets allows for the elimination of operations 124 and 126. The preprocessing allows for educated elimination of elements in one or both sorted sets based on the sizes of the respective sets, thereby running in fixed time and not adding to the complexity of the algorithm while providing a considerable speed improvement in most cases.

Figure 5:
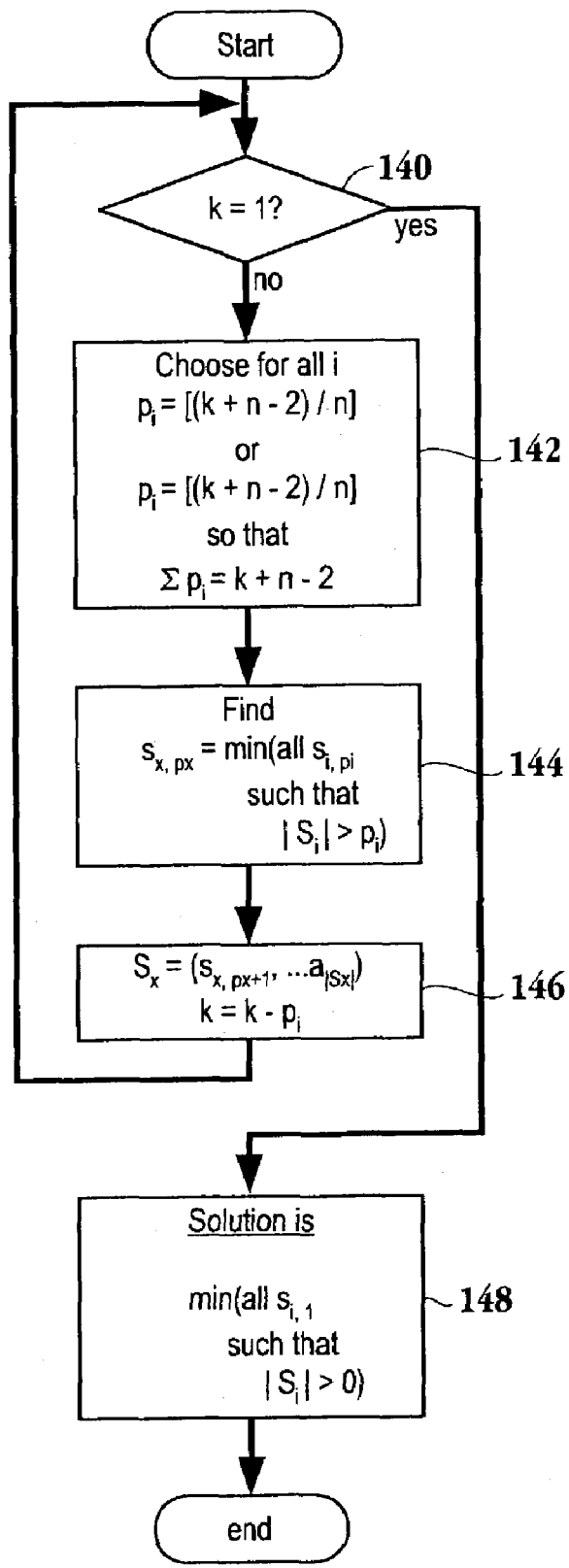
FIG. 5 is a flowchart diagram applicable to finding a k order statistic for more than two sorted sets in accordance with one embodiment of the invention.

FIG. 5 is a flowchart diagram applicable to finding a k order statistic for more than two sorted sets in accordance with one embodiment of the invention. The symbols used in FIG. 5 are defined as follows: $S_1$-$S_n$ are sorted sets, $|S_i|$ represents the size of the current iteration of set $S_i$, and $s_{i,x}$ represents the $x^{th}$ element in the current iteration of $S_i$. The method initiates with decision operation 140 where it is determined whether or not there is a base case condition, e.g., if the index value equal to one. If the index value is equal to one, then the method advances to operation 148 where a minimum element is determined from each of the first elements of each of the sorted sets. The sorted sets considered here have at least one element, i.e., the sorted sets can not be empty to be included. If the index value is not equal to one in decision operation 140, then the method proceeds to operation 142 where sub-indices corresponding to each sorted set is selected. That is, a sub-index is selected for each individual sorted set, e.g., if there are three sorted sets, then there will be three sub-indices. The sum of the sub-indices is equal to the index value plus the number of sets minus two, all divided by the number of sets, which in mathematical terms may be represented by $p_i$=(k+n−2)/n.

The method of FIG. 5 then moves to operation 144 where the elements associated with the respective sub-index for each sorted set are compared to determine a minimum element. Here again, if the sub index for a respective sorted set is out of bounds, it may be assumed that the respective sorted set does not contain a minimum. Alternatively, the sorted sets may be padded with an infinitely large value as described above, in order to balance the number of elements in the sorted sets. The method then advances to operation 146 where the minimum element and the elements preceding the minimum element from the corresponding sorted set are excluded from consideration, thereby defining a recurrence. In addition, the index value is decremented by subtracting from the index value the sub-index associated with the sorted set from which the elements are excluded from, i.e., $k=k-p_x$. It should be appreciated that operation 146 correlates to operations 124, 126 and 128 of FIG. 4. The method then returns to operation 140 and repeats as described above.

Figure 6:
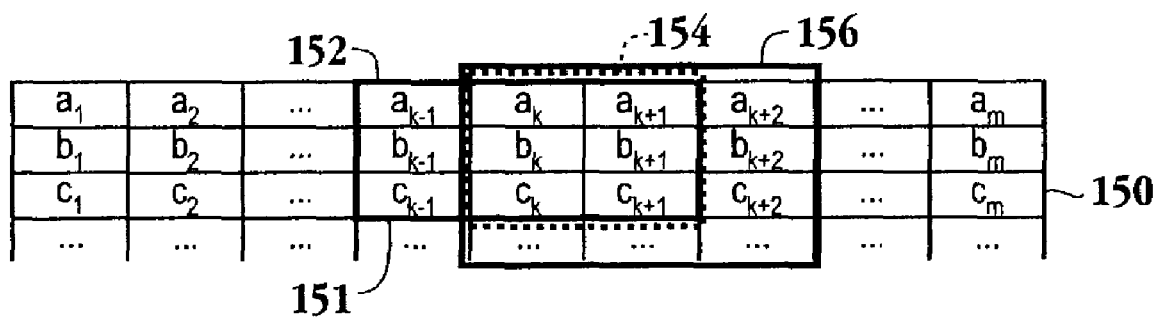
FIG. 6 is a schematic diagram illustrating a sliding window utilized for image processing where a median value is calculated in accordance with one embodiment of the invention.

FIG. 6 is a schematic diagram illustrating a sliding window utilized for image processing where a median value is calculated in accordance with one embodiment of the invention. Pixel value grid 150 includes a 3×3 sliding window 151. Sliding window 151 may be subdivided into a single column 152 and elements of region 154. The elements of region 154 may be merged and sorted as described below with reference to FIG. 8. As is generally known a 3×3 sliding window median filter may be utilized with respect to the field of imaging processing. For a grid of values m wide and n tall, such as the grid illustrated in FIG. 6, each value is multiplied with the median value of itself and its 8 neighbors (for values at the borders, the nearest available 3×3 median is used). Therefore, each 3×3 window requires a median value to be found. By processing adjacent values consecutively, a sliding window property is maintained. That is, sliding window 151 advances one column to the right to define a next 3×3 sliding window in region 156. It should be appreciated that, region 156 is three rows high, i.e., defines a 3×3 grid including the rows having $a_k$, $b_k$, and $c_k$. For illustrative purposes, in order to separately identify regions 152, 154 and 156 the bottom border line of region 156 falls below the row including $c_k$. Another median value is then calculated for the 3×3 sliding window of region 156. As the sliding window reaches the end of the right side of the grid, the window is returned to the left side and dropped down one row. This process is repeated until the sliding window reaches the bottom left of the image.

The embodiments described herein may be used to increase the speed by reducing the average number of comparisons when implementing a sliding-widow 3×3 median filter. Here, the greatest speed increase is achieved by increasing the number of comparisons that can be recycled, i.e. comparisons that are useful in more than one iteration. Accordingly, the embodiments described herein allow for the number of recyclable comparisons to be increased, thereby enhancing performance. For example, assuming the sliding window is moving from left to right, i.e., a first 3×3 median value for $b_2$ is found, then $b_3$, and so on. It should be appreciated that medians for border values are not determined in one embodiment of the invention.

Still referring to FIG. 6, a median for $b_k$ (region 151) is first calculated and then a median for $b_k+1$ (region 156) is calculated thereafter. An exemplary technique first includes sorting each 3-value column of the sliding window (region 151) in memory. It should be appreciated that this step can be reused in finding 3 medians and is performed in 3 comparisons, yielding an average of 1 comparison per median per column, or 3 comparisons per median for 3 columns. Next, the last two columns are merged to create a sorted 6-value array of the values of region 154. That is, the columns with the k and the k+1 values are merged. This can be done in 5 steps, and can be reused for finding the next median (e.g. median for $b_{k+1}$), therefore, the average cost is 2.5 per median. Then, the median of the sorted values from the merged set and the remaining column (e.g. column k−1) is calculated by the embodiments described herein. That is, the merged set and the remaining column are two sorted sets where a first sorted set has three elements and a second sorted set has 6 elements and the $5^{th}$ smallest element needs to be determined. Using the technique described with reference to FIGS. 4, 5, and 7, results in 3 comparisons where an optimization step is applied. In the optimization step, it is recognized that only the middle four elements of the merged array are possible solutions, making the problem that of finding $4^{th}$ element in two arrays of sizes 3 and 4.

The worst-case average number of comparisons per median is approximately 8.5 with the above described technique. This number is in reality higher, however, for a sufficiently large m (number of columns), the average number of comparisons asymptotically approaches 8.5 even considering that some column sorts may not be reused 3 times, e.g., on the far left and right, and that it may be possible for one merge per row to not be reused.

As mentioned above, certain optimizations may be applied to the embodiments described herein for finding a k order statistic. One exemplary optimization may be applied where k is greater than m but smaller than n (k being the index value, m being a number of rows of a first sorted set and n being a number of rows of the second sorted set). Here all the elements of A (the first sorted set) are possible solutions. However, the number of possible solutions in B (the second sorted set) is m+1, or to be more exact, the range of possible solutions in B is $b_{k-m}, \ldots, b_k$. That is, if all the elements of A are smaller than the k order statistic, then the solution is $b_{k-m}$. On the other hand, if all the elements of A are greater than the solution, the solution is bk. Depending on the values of elements in A, the intermediate values from B could also be the solution. Therefore, an optimization that reduces k dramatically in one step may be applied in this situation. If $B'=\{b_{k-m}, \ldots, b_k\}$, then the problem is equivalent to searching for k'=m+1 order statistic or A and B'. This optimization is the optimization referred to with reference to FIG. 6, i.e., where k is five, m is three and n is six. It should be appreciated that where k is greater than n but smaller than m, the same optimization may be applied with A and B swapped.

Another exemplary optimization occurs where k is greater than both m and n. The search for the k order statistic may be reduced to searching for m+n+1 −k largest element of A and B. Following the reasoning discussed above with the first exemplary optimization, the last m+n+1−k elements of A and B are the only possible solutions here. Therefore, the first k−n−1 elements of A and first k−m−1 elements of B are not possible solutions. If we define $A'=\{a_{k-n}, \ldots a_m\}$ and $B'=\{b_{k-m}, \ldots b_n\}$, then the problem is equivalent to searching for k'=m+n+2−k order statistic of A' and B'. In effect, the optimization step ensures that the order of the algorithm becomes $n^2$ log (min(k, m, n, m+n−k)). It should be appreciated that for a large k, this optimization is a very significant improvement in terms of time and memory resources.

Figure 7:
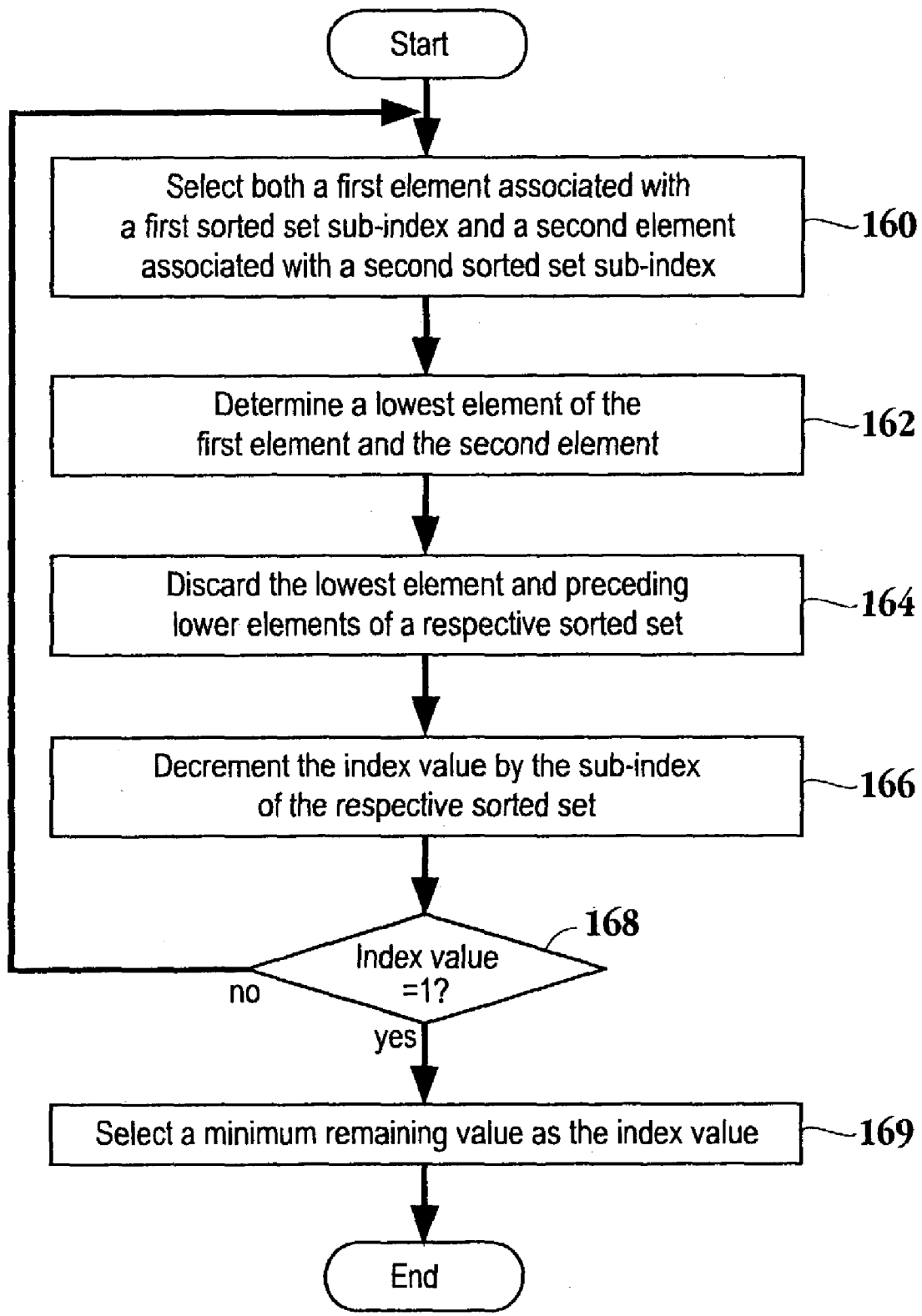
FIG. 7 is a flowchart diagram of the method operations for determining an element corresponding to an index value for a union of a first sorted set and a second sorted set in accordance with one embodiment of the invention.

FIG. 7 is a flowchart diagram of the method operations for determining an element corresponding to an index value for a union of a first sorted set and a second sorted set in accordance with one embodiment of the invention. The method initiates with operation 160 where both a first element associated with a first sorted set sub-index and a second element associated with a second sorted set sub-index are selected. Here, the first sorted set sub-index and the second sorted set sub-index may correspond to p and q described above with reference to FIGS. 3A-3E and 4. The first and second elements are elements of the first and second sorted sets, respectively. The method then advances to operation 162 where a lowest element of the first element and the second element are determined. Here, the first and second elements are compared to determine the relationship between the first and second elements as described above. The method then proceeds to operation 164 where the lowest element and the preceding lower elements of a respective sorted set are discarded. For example, if the first element is determined to be less than the second element in value, then the first element and corresponding preceding elements of the first sorted set are discarded, i.e., eliminated from consideration as potential locations for the index value.

The method of FIG. 7, then moves to operation 166 where the index value is decremented by the sub-index of the respective sorted set. As discussed above with reference to FIGS. 3C-3E, the sub-index value is subtracted from the index value. It should be appreciated that the sub-index value here, also indicates the number of elements discarded from the respective sorted set. In one embodiment, decrementing the index value and the operations leading up to the reduction of the index value define a recurrence. The method then advances to decision operation 168 where it is determined if the index value is equal to one. If the index value is not equal to one, then the method moves to operation 160 and proceeds as described above. If the index value is equal to one, then the method proceeds to operation 169. In operation 169, a minimum remaining value is selected as the index value. Here, the first elements of the first and second sorted sets are compared to determine the minimum remaining value.

Figure 8:
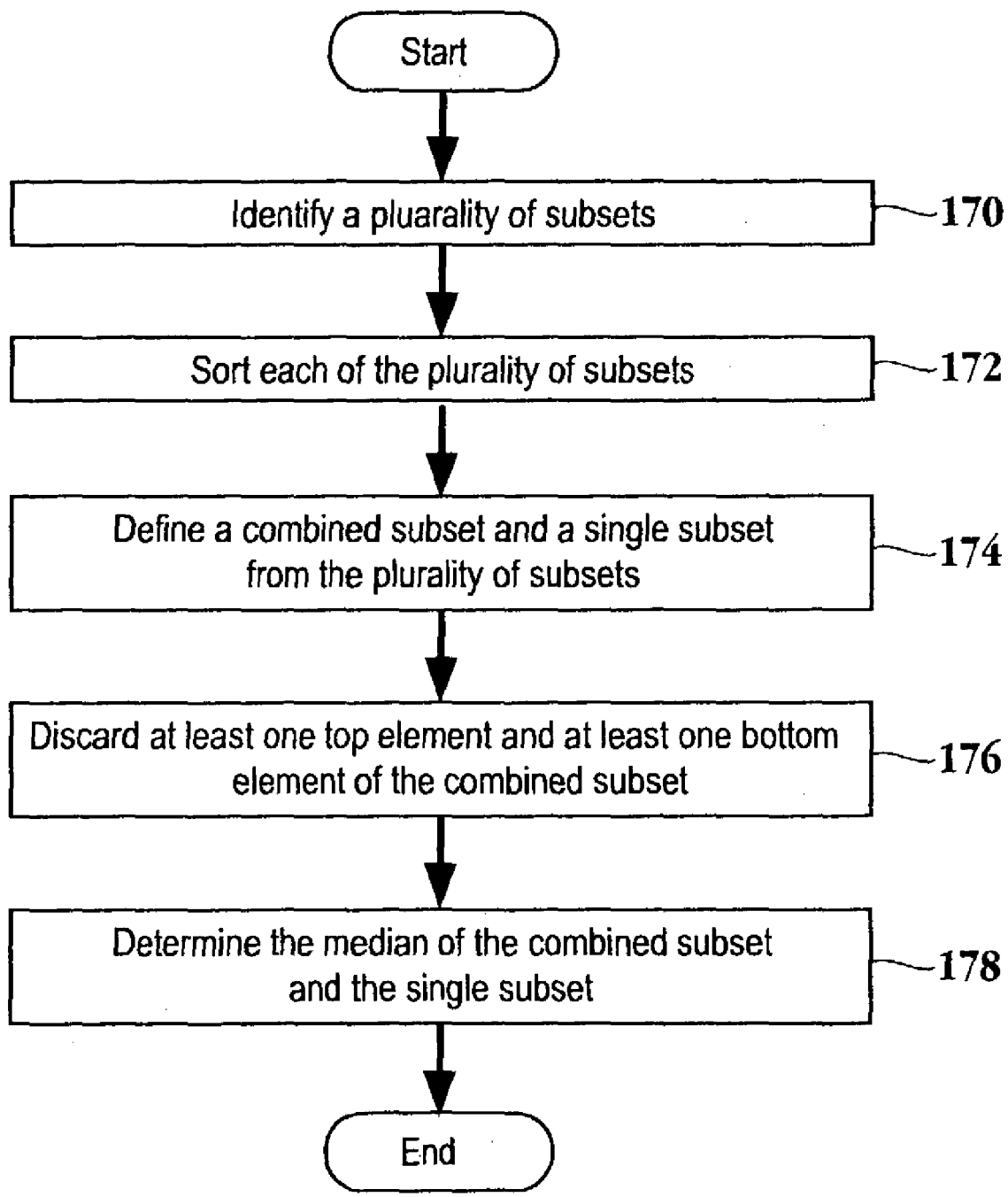
FIG. 8 is a flowchart diagram of the method operations for determining a median value for a sliding window in accordance with one embodiment of the invention.

FIG. 8 is a flowchart diagram of the method operations for determining a median value for a sliding window in accordance with one embodiment of the invention. The method initiates with operation 170 where a plurality of subsets are defined. Here, the plurality of subsets may be columns of a sliding window, such as each of the columns of the sliding window of FIG. 6. The method then advances to operation 172, where each of the plurality of subsets are sorted. That is, the elements in each of the plurality of subsets are arranged so that each subset is a sorted subset. The method then proceeds to operation 174 where a combined subset and a single subset are defined from the plurality of subsets. For example, two of the columns of a 3×3 median filter may be merged to define a combined subset as discussed with reference to FIG. 6.

The method of FIG. 8 then moves to operation 176 where at least one top element and at least one bottom element of the combined subset are discarded. With respect to a 3×3 median filter, the median (k) is 5 and the combined subset has 6 elements (m), while the single subset contains 3 elements (n). As described with reference to optimizations below, the first and last elements of the combined subset are not possible solutions. Therefore, in that case, the number of top and bottom elements, i.e., pair of elements, is one. Thus, the first and the last elements may be eliminated. In general the number, i.e., pair of elements, is equal to a half of the difference between the number of elements in the combined subset and the single subset, rounded down. It should be appreciated that more than one pair of top and bottom elements may be discarded. The method then advances to operation 178 where the median of the combined subset and the single subset is determined as described herein. That is, the median is a k order statistic and the combined subset and the single subset are both sorted subsets. Accordingly, a recurrence is defined, where the recurrence reduces the index value to a base case. In the base case, a minimum remaining element, selected from the remaining elements of the combined subset and the single subset, represent the median value for the 3×3 sliding window.

Figure 9:
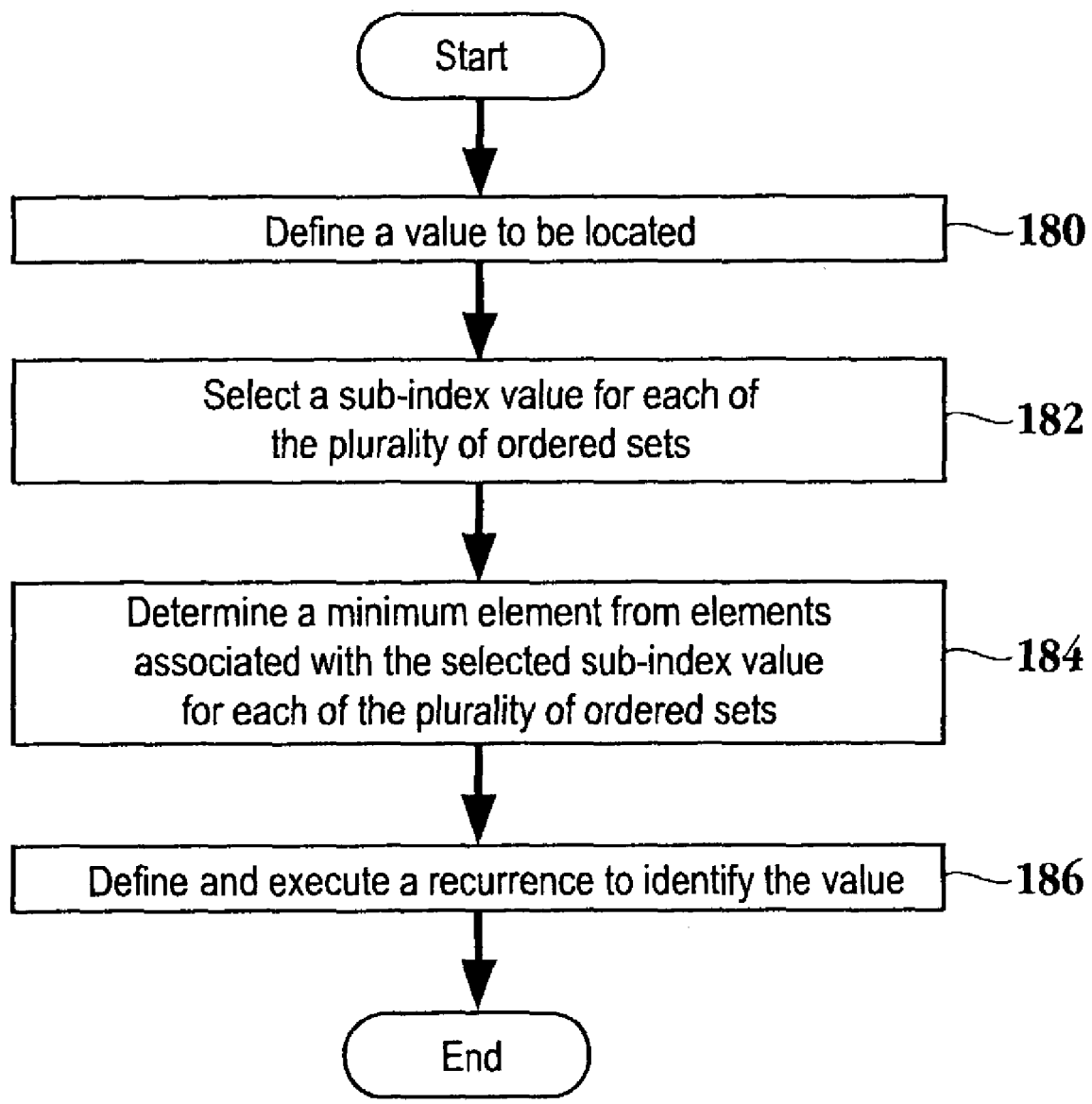
FIG. 9 is a flowchart diagram of the method operation for searching a plurality of sorted sets for a desired location within a union of the plurality of sorted sets without merging the sets in accordance with one embodiment of the invention.

FIG. 9 is a flowchart diagram of the method operation for searching a plurality of sorted sets for a desired location within a union of the plurality of sorted sets without merging the sets in accordance with one embodiment of the invention. The method initiates with operation 180 where a value, e.g., an index value, to be located is defined. The index value may be referred to as a k order statistic. Additionally, the index value may be the $k^{th}$ smallest value of the union of the plurality of sorted sets, the $k^{th}$ largest value, a median value, a percentile value, etc. The method then advances to operation 182 where a sub-index value for each of the plurality of sorted sets is selected. For example, the sub-index value may be calculated as described with reference to FIG. 4 where there are two sorted sets. Alternatively, the sub-index value may be calculated as described with reference to FIG. 5 where there are more than two sorted sets. As mentioned above, the sub-index may be calculated so that the method runs in logarithmic time.

The method of FIG. 9 then proceeds to operation 184 where a minimum element chosen from elements associated with the selected sub-index for each of the plurality of sorted sets is determined in accordance with one embodiment of the invention. Here, each of the elements associated with the sub-index for each of the sorted sets is compared to designate a minimum element, i.e., the minimum element has the lowest value of the compared elements. The method then moves to operation 186 where a recurrence is defined. In one embodiment, the recurrence may be defined as the elimination of appropriate elements in a sorted set and a corresponding reduction of the index value by a value associated with the elimination of the appropriate elements. This recurrence may be repeated to incrementally reduce the index value to a base case, which occurs when the index value equals one. For example, the recurrence may be defined as discussed above with reference to FIG. 7.

Figure 10:
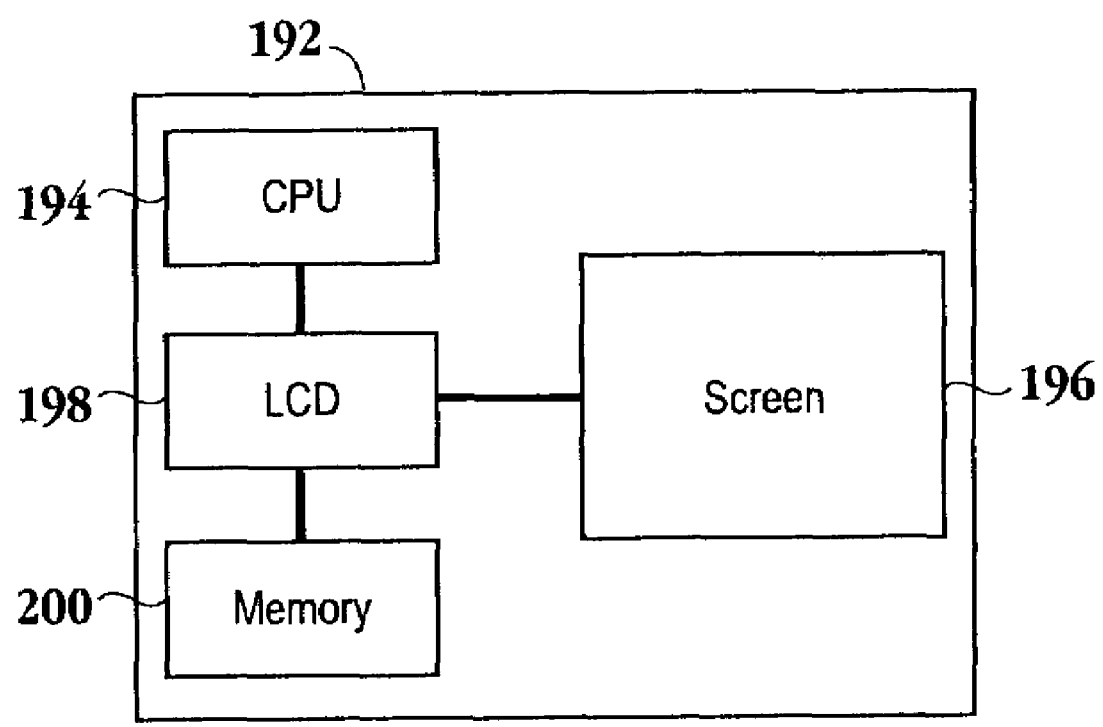
FIG. 10 is a simplified block diagram of components of a computing device configured to locate a k order statistic in accordance with one embodiment of the invention.

FIG. 10 is a simplified block diagram of components of a computing device configured to locate a k order statistic in accordance with one embodiment of the invention. Computing device 100 includes central processing unit (CPU) 102 in communication with liquid crystal display (LCD) controller 104. LCD controller 104 is in communication with memory 106 and display screen 108. LCD controller 104 includes circuitry for translating a two dimensional pixel address associated with display screen 108 to a linear address in memory 106, as will be described in more detail below. Computing device 100 can be any handheld device or in general any portable electronic device having a display screen controlled by an LCD controller.

In one embodiment, LCD controller includes circuitry configured to implement the methods described herein. That is, the functionality of FIGS. 7-9 may be accomplished through circuitry configured to perform this functionality. More particularly, the LCD controller may include circuitry for determining the median of a 3×3 sliding window with reference to FIG. 8. Of course, the code performing the location of a median, e.g., as related to image processing applications, may be hard coded onto a semiconductor chip. One skilled in the art will appreciate that the semiconductor chip can include logic gates configured to provide the functionality discussed above. For example, a hardware description language (HDL) can be employed to synthesize the firmware and the layout of the logic gates for providing the necessary functionality described herein. It should be appreciated that a LCD display controller is shown here for exemplary purposes only and is not meant to be limiting. That is, any display controller may include the circuitry configured to perform the functionality described above.

In summary, the above described invention allows for a method and system for determining a location of a value associated with a union of two or more sorted sets. The location of the value is determined without the sorted sets being merged. Therefore, where the sorted sets are located in incompatible databases, the location, i.e., k order statistic, may be determined. Furthermore, the method and the system enable the elimination of merging the sorted sets especially where the merged sorted sets will not be used for anything further. The method described herein defines a recurrence that runs in logarithmic time. The recurrence methodically reduces an index value to a base case. In the base case, a minimum Value selected from each of the minimum remaining elements of the sorted sets is the value being searched for, i.e., the k order statistic. In one particular application, the method and system described herein are utilized for finding a median value for a sliding window, such as sliding windows used with respect to image processing. As described above, a display controller may have circuitry configured to execute the functionality for locating a k order statistic.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer-readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for determining an element corresponding to an index value for a union of a first sorted set and a second sorted set, each of the first and second sorted sets having a plurality of elements stored in a memory, the method comprising:
    a) selecting both a first element associated with a first sorted set sub index and a second element associated with a second sorted set sub index, a sum of the first sorted set sub index and the second sorted set sub index being equal to an index value;
    b) determining a lowest element of the first element and the second element;
    c) discarding the lowest element and preceding lower elements of a respective sorted set;
    d) decrementing the index value by the sub index of the respective sorted set;
    e) repeating operations a)-d) until the index value equals one; and
    when the index value reaches one, selecting in the memory a minimum remaining value as the element corresponding to the index value.

2. The method of claim 1, wherein a sub-index value is equal to a number of discarded elements.

3. The method of claim 1, wherein the index value is a k order statistic.

4. The method of claim 1, wherein the first sorted set and the second sorted set are derived from pixel data associated with an image.

5. The method of claim 1, wherein the method is performed without merging the first and second sorted sets in the memory.

6. A method for determining a k order statistic across a plurality of sorted sets, each of the plurality of sorted sets has a plurality of elements stored in a memory, the method comprising:
    a) identifying an index value associated with the k order statistic;
    b) defining a sub-index value for each of the plurality of sorted sets;
    c) eliminating a lowest value element and all preceding elements from a sorted set corresponding to the lowest value element;
    d) decrementing the index value by an amount equal to a number of eliminated elements;
    e) repeating operations b)-d) until the index value equals one;
    when the index value reaches one, selecting in the memory a minimum remaining element from one of the plurality of sorted sets as a location of the k order statistic.

7. The method of claim 6, wherein a sum of each of the sub-index value for each of the plurality of sorted sets is equal to the index value plus a number of sorted sets minus 2.

8. The method of claim 6, wherein the method operation of defining a sub-index value for each of the plurality of sorted sets includes,
    comparing values associated with each sub index value; and
    determining the lowest value element from the values associated with each sub-index value.

9. The method of claim 6, wherein a number of eliminated elements is equal to a sub-index value associated with the lowest value element.

10. The method of claim 6, wherein the method operation of repeating operations b)-d) for remaining values of the plurality of sorted sets until the index value equals one defines a recurrence.

11. The method of claim 6, wherein the method is performed without merging the plurality of sorted sets in the memory.

12. A method for determining a k order statistic, comprising:
    identifying at least two sorted sets, each of the at least two sorted sets has a plurality of elements stored in a memory;
    defining a recurrence configured to eliminate elements of the at least two sorted sets, wherein the defining includes,
        selecting a sub-index value for each of the at least two sorted sets;
        determining a minimum element from elements associated with the sub-index value for each of the at least two sorted sets; and eliminating the minimum element and all preceding elements from a sorted set corresponding to the minimum element;

reducing an index value associated with a k order statistic through the recurrence to obtain a base case; and after obtaining the base case, selecting in the memory a minimum value of remaining elements from the at least two sorted sets, the minimum value corresponding to the k order statistic.

13. The method of claim 12, further comprising:

balancing the at least two sorted sets so that each of the at least two sorted sets contain a same number of elements.

14. The method of claim 12 wherein the base case occurs when the index value equals one.

15. The method of claim 12 wherein a sum of the sub-index value for each of the at least two sorted sets is equal to the index value.

16. The method of claim 12, wherein the method is performed without merging the at least two identified sorted sets in the memory.

17. A computer readable storage media having program instructions for determining a k order statistic, comprising:

program instructions for identifying at least two sorted sets, each of the at least two sorted sets has a plurality of elements stored in a memory;

program instructions for defining a recurrence to eliminate elements of the at least two sorted sets, wherein the defining includes, program instructions for selecting a sub-index value for each of the at least two sorted sets;

program instructions for determining a minimum element from elements associated with the sub-index value for each of the at least two sorted sets; and program instructions for eliminating the minimum element and all preceding elements from a sorted set corresponding to the minimum element;

program instructions for reducing an index value associated with a k order statistic through the recurrence to obtain a base case; and program instructions for selecting in the memory a minimum value of remaining elements of the at least two sorted sets after obtaining the base case, the minimum value corresponding to the k order statistic.

18. The computer readable storage media of claim 17, wherein the base case occurs when the index value equals one.

19. The computer readable storage media of claim 17, further comprising:

program instructions for re-selecting the sub-index value for each of the at least two sorted sets after each reduction of the index value.

20. The computer readable storage media of claim 17, wherein the program instructions are carried without merging the at least two identified sorted sets in the memory.

* * * * *